(12) United States Patent
Lai et al.

(10) Patent No.: US 9,734,449 B2
(45) Date of Patent: Aug. 15, 2017

(54) METHOD AND APPARATUS FOR RUN-TIME USER CONTROL OF SYSTEM-GENERATED CONTENT

(75) Inventors: Jennifer Lai, Garrison, NY (US); Jie Lu, Hawthorne, NY (US); Lauren G. Wilcox, New York, NY (US)

(73) Assignee: International Business Machines Corporation, Armonk, NY (US)

(*) Notice: Subject to any disclaimer, the term of this patent is extended or adjusted under 35 U.S.C. 154(b) by 1949 days.

(21) Appl. No.: 12/512,500

(22) Filed: Jul. 30, 2009

(65) Prior Publication Data

US 2011/0029472 A1 Feb. 3, 2011

(51) Int. Cl.
*G06N 5/02* (2006.01)
*G06N 5/04* (2006.01)
*H04L 29/08* (2006.01)
*H04L 29/06* (2006.01)
*G06F 17/27* (2006.01)
*G06F 17/28* (2006.01)

(52) U.S. Cl.
CPC ............... *G06N 5/025* (2013.01); *G06N 5/04* (2013.01); *G06F 17/2785* (2013.01); *G06F 17/28* (2013.01); *H04L 65/403* (2013.01); *H04L 67/10* (2013.01)

(58) Field of Classification Search
USPC .................. 706/47; 704/9; 709/204
See application file for complete search history.

(56) References Cited

U.S. PATENT DOCUMENTS

| | | | |
|---|---|---|---|
| 7,003,522 B1* | 2/2006 | Reynar et al. | 707/736 |
| 7,237,205 B2* | 6/2007 | Sarel | 715/786 |
| 2003/0125929 A1* | 7/2003 | Bergstraesser et al. | 704/9 |
| 2004/0268231 A1* | 12/2004 | Tunning | G06F 17/2247 715/236 |
| 2005/0229150 A1* | 10/2005 | Ronnewinkel | G06F 8/34 717/101 |
| 2008/0270538 A1* | 10/2008 | Garg et al. | 709/204 |
| 2009/0112832 A1* | 4/2009 | Kandogan et al. | 707/4 |

OTHER PUBLICATIONS

Wilcox et al., "activeNotes: Computer-Assisted Creation of Patient Progress Notes", CHI Boston, MA (Apr. 2009), pp. 1-6.

* cited by examiner

*Primary Examiner* — Kakali Chaki
*Assistant Examiner* — Mai T Tran
(74) *Attorney, Agent, or Firm* — Ryan, Mason & Lewis, LLP

(57) ABSTRACT

Methods and apparatus are provided for run-time user control of system-generated content. A user is presented with the system-generated content and can configure one or more rules at run-time. The rules identify one or more automated actions to perform upon the system-generated content when one or more conditions are satisfied. The automated actions are executed upon the system-generated content when the one or more conditions are satisfied. The exemplary automated actions may comprise transform, retrieve, update and alert. The conditions can specify, for example, when to perform the automated actions. Active tags may optionally be attached to or embedded directly in the system-generated content or in a document containing the system-generated content. Tools are optionally provided to allow a user to manage active tags.

23 Claims, 6 Drawing Sheets

FIG. 1

| AUTOMATED ACTIONS TO BE PERFORMED ON SYSTEM-GENERATED CONTENT /101 | USER-SPECIFIED RULES AND INSTRUCTIONS TO CUSTOMIZE AUTOMATED ACTIONS /102 |
|---|---|
| 1. TRANSFORM | 1. CHANGE THE FORMAT OF THE CONTENT (e.g., EMBOLDEN IT) UNDER A PARTICULAR CONDITION (e.g., WHEN PRINTED IN BLACK AND WHITE)<br>2. TRANSFORM THE TEXT OF THE CONTENT (e.g., LOWER/HIGHER PRECISION OF A NUMBER) UNDER A PARTICULAR CONDITION |
| 2. RETRIEVE | 1. RETRIEVE THE INFORMATION THAT SATISFIES A PARTICULAR CONSTRAINT<br>2. DISPLAY THE RESULT IN A PARTICULAR FORM (e.g., TABLE OR CHART)<br>3. SUMMARIZE THE RESULT USING PARTICULAR STATISTICS (e.g., MAX, AVG) |
| 3. UPDATE | 1. RETRIEVE THE UPDATED VALUE AT A PARTICULAR TIME (e.g., 5 PM)<br>2. RETRIEVE THE UPDATED VALUE AT A SPECIFIED SCHEDULE (e.g., EVERY HOUR)<br>3. AUTOMATICALLY REPLACE THE ORIGINAL VALUE WITH THE UPDATED VALUE<br>4. TRACK AND DISPLAY ALL VALUES |
| 4. ALERT | 1. TRIGGER AN ALERT WHEN THE UPDATED VALUE GOES ABOVE/BELOW A THRESHOLD<br>2. TRIGGER AN ALERT WHEN THE DIFFERENCE BETWEEN THE ORIGINAL VALUE AND THE UPDATED VALUE GOES ABOVE/BELOW A THRESHOLD<br>3. GENERATE THE ALERT MESSAGE IN A PARTICULAR FORMAT<br>4. SEND THE ALERT TO PARTICULAR EMAIL ADDRESS(ES)<br>5. SEND THE ALERT TO PARTICULAR PAGE NUMBER(S)<br>6. SEND THE ALERT TO PARTICULAR MOBILE PHONE NUMBER(S) |

| TYPE OF TAG OPERATION | TAG OPERATION |
|---|---|
| 1. ACCESS | 1. VIEW THE CONTENT AND USER-SPECIFIED PARAMETERS ASSOCIATED WITH A SINGLE TAG<br>2. VIEW THE CONTENT AND USER-SPECIFIED PARAMETERS ASSOCIATED WITH A GROUP OF TAGS |
| 2. EDIT | 1. CHANGE THE USER-SPECIFIED PARAMETERS ASSOCIATED WITH A SINGLE TAG<br>2. CHANGE THE USER-SPECIFIED PARAMETERS ASSOCIATED WITH A GROUP OF TAGS<br>3. REMOVE A SINGLE TAG<br>4. REMOVE A GROUP OF TAGS |
| 3. GROUP | 1. CREATE A GROUP OF TAGS BASED ON USER-SPECIFIED CRITERIA<br>2. CREATE A SUPER-GROUP OF TAG GROUPS BASED ON USER-SPECIFIED CRITERIA |
| 4. TAG TEMPLATE | 1. CREATE A TAG TEMPLATE TO STORE A SET OF USER-SPECIFIED PARAMETERS<br>2. APPLY A TAG TEMPLATE TO A TAG FOR AUTOMATICALLY FILLING IN THE USER-SPECIFIED PARAMETERS STORED IN THE TAG TEMPLATE |

400

METHOD AND APPARATUS FOR RUN-TIME USER CONTROL OF SYSTEM-GENERATED CONTENT

FIELD OF THE INVENTION

The present invention relates to information management and, more particularly, to methods and apparatus for supporting run-time user control of system-generated content.

BACKGROUND OF THE INVENTION

Many systems automatically generate content fragments, snippets or excerpts to include information dynamically retrieved from data repositories. For example, a web server that supports dynamic web technologies can dynamically create the content of a web page to include a company's financial information stored in a database. Most of these systems also support automated actions upon system-generated content such as updating the value of the dynamic information contained in the content and creating alerts associated with updates.

For example, the web servers that generate dynamic web pages can periodically update the web page with the most recent numbers from the company's revenues and profits. However, setting up automated actions (e.g., retrieval, updates, and alerts) for system-generated content is mostly conducted during system configuration and often requires system-specific knowledge and skills exclusive to IT professionals. For average users who desire flexible control over system-generated content for customizing it to meet their dynamic needs and preferences, the lack of system support makes it difficult if not impossible to do so. A need therefore exists for an information system that supports run-time user control of system-generated content.

SUMMARY OF THE INVENTION

Generally, methods and apparatus are provided for run-time user control of system-generated content. According to one aspect of the invention, a user is presented with the system-generated content and can configure one or more rules at run-time. The rules identify one or more automated actions to perform upon the system-generated content when one or more conditions are satisfied. The automated actions are executed upon the system-generated content when the one or more conditions are satisfied. The system-generated content can be generated, for example, based on one or more user-specified or system-generated information requests. The automated actions may comprise, for example, transform, retrieve, update and alert. The conditions can specify, for example, when to perform the automated actions.

An active tag may optionally be attached to or embedded directly in the system-generated content or in a document containing the system-generated content. The optional active tag can include options to configure the automated actions. In addition, the active tag can further comprise information about the content, a context in which the content occurs, system-generated parameters for the automated actions, or user-specified parameters for customizing an execution of the automated actions (or a combination of the foregoing).

According to further aspects of the invention, tools are optionally provided to allow a user to manage active tags. In one exemplary embodiment, the user management tools for managing active tags comprise tools for accessing active tags, editing active tags, grouping active tags, creating a template for active tags and reusing templates for active tags.

A more complete understanding of the present invention, as well as further features and advantages of the present invention, will be obtained by reference to the following detailed description and drawings.

BRIEF DESCRIPTION OF THE DRAWINGS

FIG. 1 is a sample table illustrating an exemplary set of automated actions to be performed on system-generated content that may be configured by user rules and instructions specified at run time;

FIG. 4 is a sample table illustrating exemplary tag operations that may be supported by a preferred embodiment of the invention to let users control and manage previously created active tags;

DETAILED DESCRIPTION OF PREFERRED EMBODIMENTS

Figure 2:
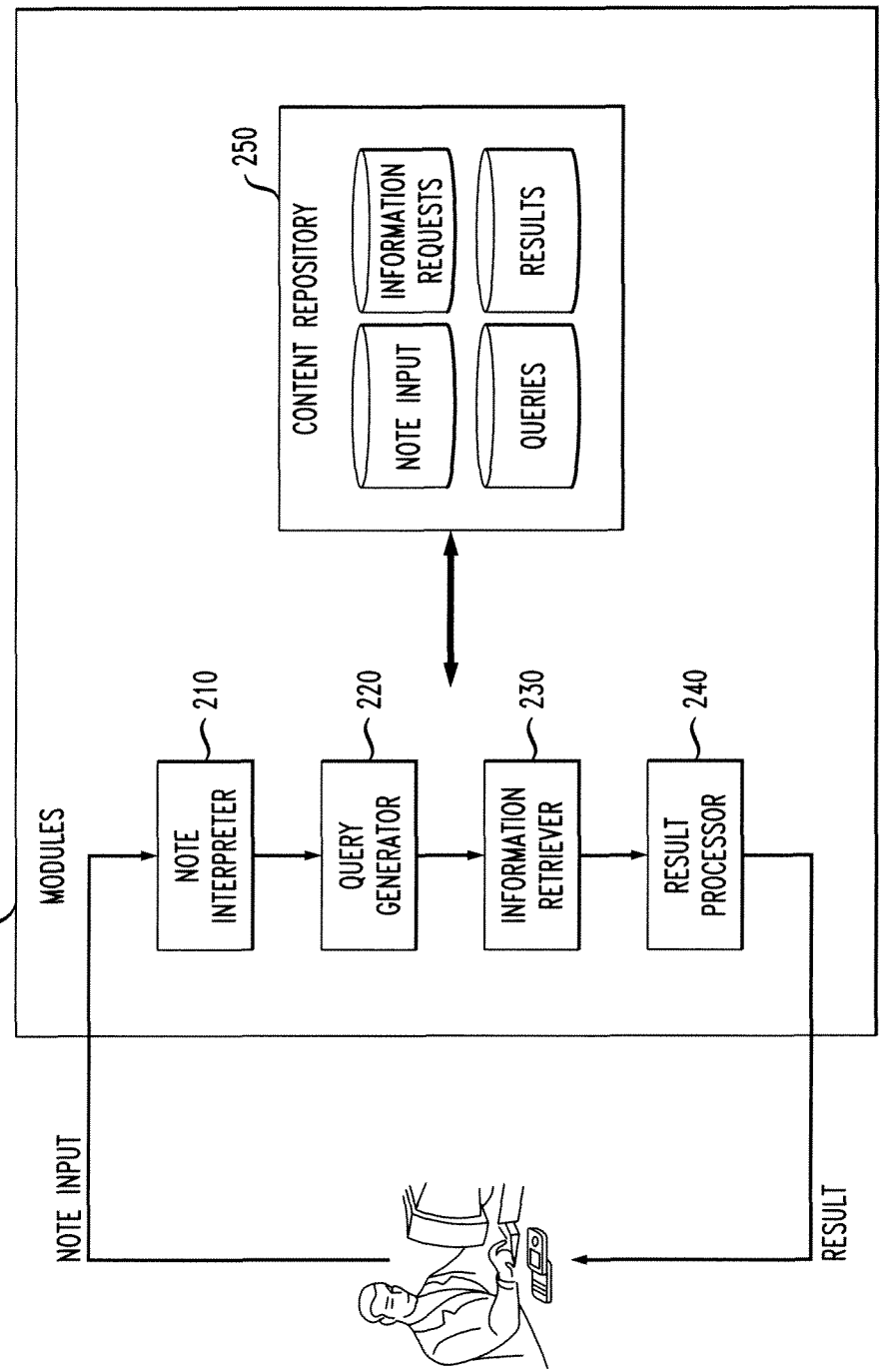
FIG. 2 is a schematic block diagram describing an exemplary information system that may be augmented by the present invention to support run-time user control of system-generated content.

The present invention describes methods for supporting run-time user control of system-generated content. In one exemplary embodiment, the control takes the form of "active tags," such that a piece of system-generated content can be associated with an active tag at run time, which allows users to specify rules and instructions to customize system-supported automated actions to be performed on the tagged content and may alter the nature of the content. For example, using a system that automatically retrieves and includes a patient's blood oxygen levels in a patient progress report, the methods of the present invention enable a user to tag the text corresponding to the patient's blood oxygen levels in the report to request that the updated values of the patient's blood oxygen levels be automatically retrieved and inserted in the report before a static version of the report is created (e.g., saved or printed). The system then performs the automated update action on the patient's oxygen levels according to the user-given instruction specified in the tag.

According to one aspect of the invention, users provide run-time rules and instructions that specify automated actions to perform upon system-generated content. In addition, the users can specify when and how to perform these actions. The system configures the automated actions based on the user-specified rules and instructions, and executes the actions accordingly. In one exemplary implementation, users provide rules and instructions about the automated actions of a system-generated content fragment by customizing an active tag that can be attached to the content either manually by users or automatically by the system. Such a tag includes information about the associated content, the context in which the content occurs, system-generated parameters for the automated actions, and user-specified parameters for customizing what, when, and how the automated actions are executed.

According to yet another aspect of the invention, a tag control is displayed that allows users to manage existing tags. The tag control supports access, editing, and grouping of tags, as well as creating and reusing of tag templates for common user-specified parameters. When a tagged content fragment is saved to a document, the system automatically embeds the associated tag in the document. The information included in an embedded tag is automatically restored when the document is reloaded by the system. While the present invention is illustrated in the context of an exemplary user interactive notes application, the present invention may be applied to any system-generated content, as would be apparent to a person of ordinary skill in the art.

FIG. 1 is a sample table 100 illustrating an exemplary set of automated actions that may be configured using active tags for run-time user control of system-generated content. For each exemplary automated action 101, users can provide rules and instructions 102 to customize the action 101 at run time. For example, for an update action, users can specify to have the update action executed at a particular time, or at a specified schedule. Users can also specify whether to have the original value in the associated content fragment automatically replaced with the updated value, or to have all values tracked and displayed. For an alert action, users can specify the condition(s) to trigger an alert, e.g., when the updated value or the difference between the updated value and the original one exceeds a user-defined threshold. Users can also specify the preferred alert mechanism(s) such as emailing, paging, or text messaging to mobile phones, and set the format of alert messages as well as user-specific information, such as email address, page number, or mobile phone number.

FIG. 2 is a schematic block diagram describing an exemplary information system 200 that may be augmented by the present invention to support run-time user control of system-generated content. The exemplary embodiment of FIG. 2 is based on U.S. patent application Ser. No. 12/257,660, filed Oct. 24, 2008, entitled "Methods and Apparatus for Context-Sensitive Information Retrieval Based on Interactive User Notes," (now U.S. Pat. No. 8,671,096), incorporated by reference herein. The exemplary information system 200 dynamically retrieves information based on user information requests specified in interactive notes. The exemplary information system 200 comprises a note interpreter module 210, a query generator module 220, an information retriever module 230, and a result processor module 240. The note interpreter 210 dynamically interprets user information requests specified in interactive notes. The query generator 220 automatically formulates executable data queries. The information retriever 230 retrieves the requested information. The result processor 240 generates text snippets to include the retrieved information.

In the exemplary embodiment, the information created during the process, including user note input, interpreted information requests, automatically generated queries, and retrieval results are stored in a content repository 250. If augmented with the present invention, the system 200 will enable a user to dynamically control the automated actions that can be performed upon his or her choice of system-generated text result, such as updating the information contained in the text at a particular time or at a specified schedule, and creating an alert if the updated value meets user-specified criteria.

Figure 3:
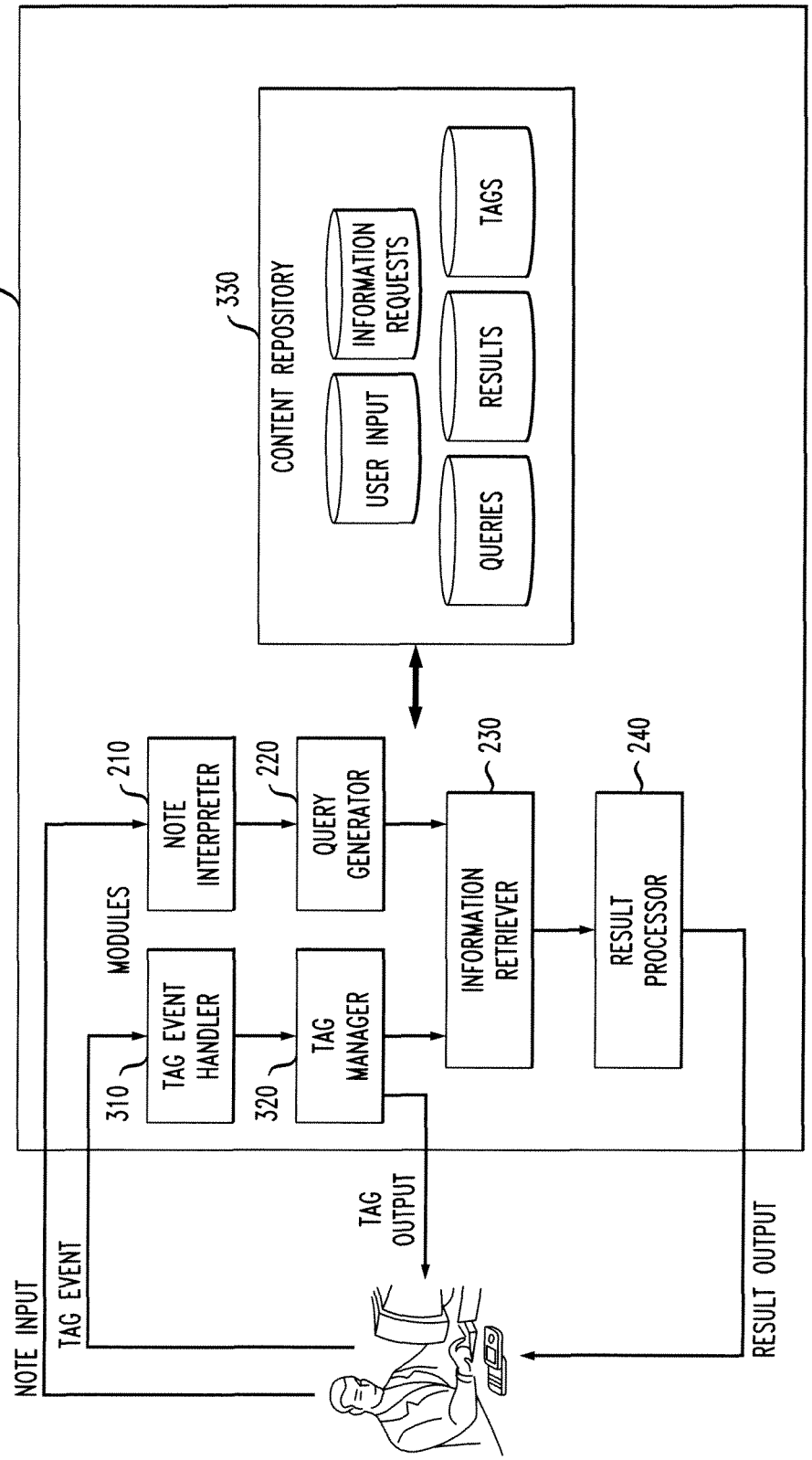
FIG. 3 is a schematic block diagram of an exemplary information system that augments the information system of FIG. 2 to incorporate features of the present invention for supporting run-time user control of system-generated content.

FIG. 3 is a schematic block diagram of an exemplary information system 300 that augments the information system 200 to incorporate features of the present invention for supporting run-time user control of system-generated content. The note interpreter module 210, query generator module 220, information retriever module 230, and result processor module 240 act in a similar manner to the above discussion in conjunction with FIG. 2. The exemplary information system 300 includes two additional modules: a tag event handler module 310 and a tag manager module 320. The tag event handler 310 and the tag manager 320 use the disclosed methods in the present invention to support run-time user control of system-generated content with active tags. The tags and the associated information are stored in the augmented content repository 330.

According to one aspect of the invention, when a user creates a new tag to attach to a system-generated content fragment, the corresponding event is sent to the tag event handler 310, that extracts the parameters indicating the tagged content, user-selected automated actions for the content, and user-specified options for these actions, and passes them to the tag manager 320. Based on the parameters, the tag manager 320 fetches resources from the content repository 330 to perform the needed operations. For example, to create a new tag to attach to a content fragment for customizing the automated update and alert actions to be performed on this content, the tag manager 320 finds in the content repository 330 the content being tagged, retrieves its corresponding information request and queries, and links them with the automated update action set up for the tagged content. The tag manager 320 also configures the tag's automated actions based on the parameters of user-specified options, e.g., setting timers for periodic updates and initializing the selected alert mechanisms. The tag manager 320 further monitors the scheduled updates for the tag and executes the update action by contacting the information retriever 230 with the linked queries for obtaining the updated results. In addition, the tag manager 320 checks whether alerts should be triggered by the updated results and creates alerts if true.

FIG. 4 is a sample table 400 illustrating exemplary tag operations that may be supported by a preferred embodiment of the invention to let users control and manage previously created active tags. According to another aspect of the invention, when a user interacts with the tag control to manage existing tags, the tag event handler 310 extracts from the corresponding event the parameters indicating the identity of the tags to be managed, the requested tag operations, and the updated user-specified options, if any. Based on the parameters, the tag manager 320 retrieves from the content repository 330 the corresponding tags and performs the needed operations. For example, to edit an existing tag, the tag manager 320 finds the tag from the content repository 330, updates it with the newly extracted parameters, and re-configures the tag's automated actions if needed. To group a set of tags, the tag manager 320 retrieves from the content repository 330 the tags to be grouped based on the parameters of the user-specified grouping criteria, and creates a list to link these tags together. To create a tag template to store a set of user-specified parameters for certain automated actions (e.g., updates at regular intervals) for easily applying similar tag options to different tags, the tag manager 320 creates an abstract active tag for storing the extracted parameters without setting up actual automated actions.

Figure 5:
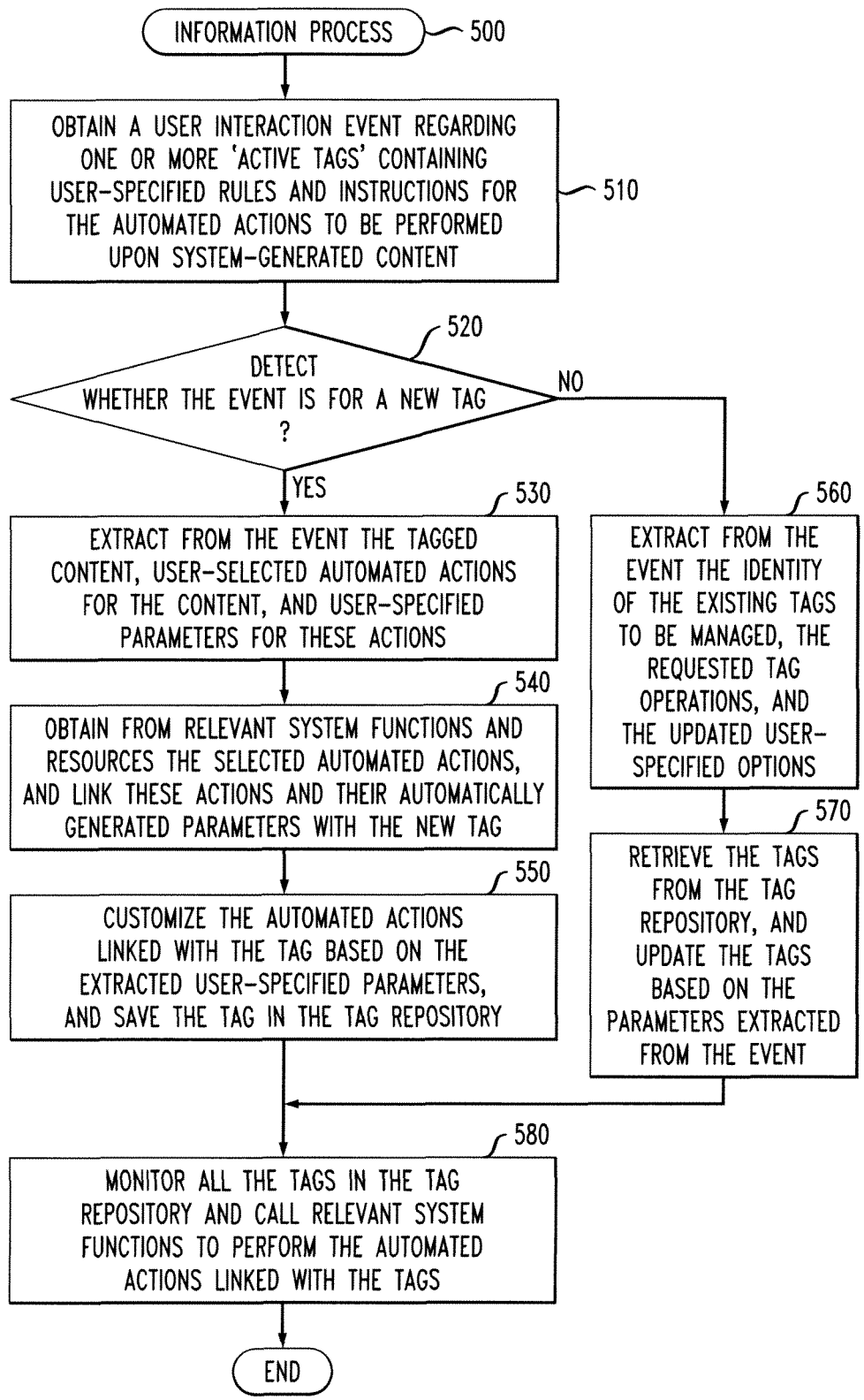
FIG. 5 is a flow chart describing an exemplary implementation of an information process that incorporates features of the present invention.

FIG. 5 is a flow chart describing an exemplary implementation of an information process that incorporates features of the present invention. Generally, the exemplary information process 500 provides run-time user control of system generated content. As shown in FIG. 5, the exemplary information process 500 obtains a user interaction event regarding one or more active tags during step 510. Thereafter, the exemplary information process 500 detects whether the event is for a new tag or for one or more existing tags during step 520.

If the event is for a new tag, the parameters indicating the content to which this new tag is associated with, user-selected automated actions for the content, and user-specified options for these actions are extracted from the event during step 530. The exemplary information process 500 obtains from relevant system functions and resources the system-supported automated actions selected by the user, and links the actions and the automatically generated parameters (e.g., queries) of these actions with the newly created tag during step 540. During step 550, the exemplary information process 500 customizes the automated actions linked with the new tag based on the parameters extracted during step 530 for user-specified options and saves the tag in the tag repository.

If, however, the event detected during step 520 is for user management of one or more existing tags through tag operations as illustrated in FIG. 4, the parameters indicating the identity of the corresponding tag(s), the requested tag operation(s), and the updated user-specified options, if any, are extracted from the event during step 560. During step 570, the exemplary information process 500 retrieves the tag(s) from the tag repository, updates the tag(s) based on the extracted parameters.

The exemplary information process 500 monitors all the tags in the tag repository and calls relevant system functions during step 580 to perform the automated actions associated with the tags. For example, during step 580, the monitoring may comprise obtaining a list of active tags having timers that have expired, obtaining the automated actions linked with the expired active tags and initiating the relevant system functions to execute the automated actions (e.g., transform, retrieve, update or alert) based on the parameters stored in these actions.

Figure 6:
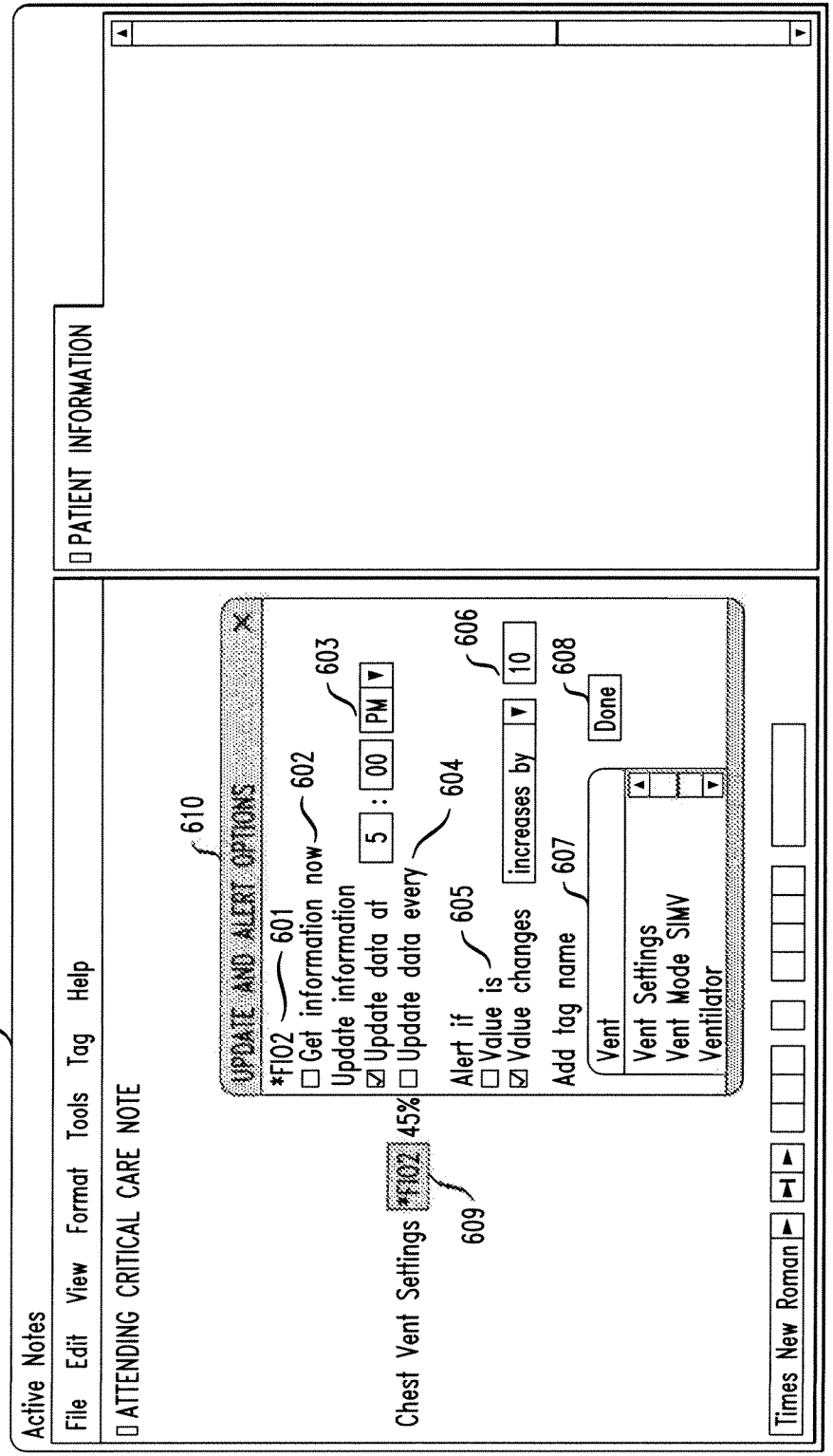
FIG. 6 illustrates an exemplary user interaction for creating a new active tag to attach to a content fragment, specifying user options for controlling the automated actions of the tagged content, and editing the tag after it is created.

FIG. 6 illustrates an exemplary user interaction 600 for creating a new tag to attach to a content fragment, specifying user options for controlling the automated actions of the tagged content, and editing the tag after it is created. To attach an active tag to a content fragment, a user can select the content fragment, and right click the mouse to bring up the context-sensitive tag menu 610. The tag menu 610 displays the content being tagged 601, and provides a number of options for automated actions including retrieval, updates, and alerts. The option to "Get information now" 602 is the default retrieval action, and it is what the system does if the user just activates a retrieval using a hot key such as Ctrl-Space without bringing up the tag menu 610. The option "Update data at . . . " 603 allows the user to schedule an update at a particular time, while the option "Update data every . . . " 604 is used to schedule periodic updates at regular intervals. For alerts, the user can choose to receive them when the updated value is above/below a particular value 605, and/or when the updated value increases/decreases by a specified amount relative to the original value 606. The user may assign a label 607 to the tag to facilitate grouping of tags. When the user finishes configuring an active tag and clicks "Done" 608 to close the tag menu, an indicator such as an asterisk symbol 609 appears to the immediate left of the tagged content to indicate that a tag has been created for that content. Double-clicking on the indicator of a tag activates its tag menu 610 again, so a user can modify previously specified options. To remove a tag, a user can simply delete its indicator 609.

Conclusion

While a number of figures show an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, microcontroller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

The information system 300 that incorporates features of the present invention comprises memory and a processor that can implement the processes of the present invention. Generally, the memory configures the processor to implement the information processes described herein. The memory could be distributed or local and the processor could be distributed or singular. The memory could be implemented as an electrical, magnetic or optical memory, or any combination of these or other types of storage devices. It should be noted that each distributed processor that makes up the processor generally contains its own addressable memory space. It should also be noted that some or all of the information system 300 that support features of the present invention can be incorporated into a personal computer, laptop computer, handheld computing device, application-specific circuit or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for run-time user control of system-generated content, comprising:
   presenting said system-generated content to a user;
   obtaining a configuration of one or more rules at run-time from said user substantially simultaneously with said user controlling said system-generated content, wherein said one or more rules identify a configuration of one or more automated actions to perform upon said system-generated content when one or more conditions are satisfied, wherein said one or more automated actions are linked to one or more active tags;
   attaching one or more of said active tags to said system-generated content, wherein at least one of said active tags comprises information about said content, a context in which said content occurs, system-generated parameters for said automated actions, and user-specified parameters for customizing an execution of said automated actions; and
   executing said one or more automated actions upon said system-generated content when said one or more conditions are satisfied.

2. The method of claim 1, wherein said system-generated content is generated based on one or more user-specified or system-generated information requests.

3. The method of claim 1, wherein said one or more automated actions comprise one or more of transform, retrieve, update and alert.

4. The method of claim 1, wherein said one or more conditions comprise one or more conditions about when to perform said one or more automated actions.

5. The method of claim 1, wherein at least one of said active tags comprises one or more options to configure said one or more automated actions.

6. The method of claim 1, wherein said content and said user-specified parameters are extracted from a user interaction event for at least one of said active tags.

7. The method of claim 1, wherein said context of said content and said system-generated parameters are retrieved from relevant system resources associated with said system-generated content.

8. The method of claim 1, wherein said content, context, system-generated parameters and user-specified parameters for said automated actions are linked with at least one of said active tags.

9. The method of claim 8, wherein said automated actions are configured based on said user-specified parameters.

10. The method of claim 8, wherein said automated actions are executed based on said system-generated parameters and said user-specified parameters.

11. The method of claim 1, further comprising the step of providing one or more tools for supporting user management of at least one of said active tags.

12. The method of claim 11, wherein said user management of at least one of said active tags comprises one or more of accessing said active tag, editing said active tag, grouping said active tag, creating a template for said active tag and reusing a template for said active tag.

13. The method of claim 12, wherein said editing of said active tag further comprises the steps of retrieving information linked with a given active tag and re-configuring corresponding parameters of said given active tag based on new user specifications.

14. The method of claim 12, wherein said template for said active tag records one or more user-specified parameters for said system-supported automated actions for application to one or more active tags associated with different content fragments.

15. The method of claim 1, further comprising the step of embedding at least one of said active tags and said system-generated content in a document.

16. The method of claim 15, further comprising the step of restoring information from said embedded active tag when said document is loaded by a system.

17. A system for run-time user control of system-generated content, comprising:
   a memory; and
   at least one processor, coupled to the memory, operative to:
   present said system-generated content to a user;
   obtain a configuration of one or more rules at run-time from said user substantially simultaneously with said user controlling said system-generated content, wherein said one or more rules identify a configuration of one or more automated actions to perform upon said system-generated content when one or more conditions are satisfied, wherein said one or more automated actions are linked to one or more active tags;
   attach one or more of said active tags to said system-generated content, wherein at least one of said active tags comprises information about said content, a context in which said content occurs, system-generated parameters for said automated actions, and user-specified parameters for customizing an execution of said automated actions; and
   execute said one or more automated actions upon said system-generated content when said one or more conditions are satisfied.

18. The system of claim 17, wherein said one or more automated actions comprise one or more of transform, retrieve, update and alert.

19. The system of claim 17, wherein said active tag comprises one or more options to configure said one or more automated actions.

20. The system of claim 19, wherein said processor is further configured to provide one or more tools for supporting user management of at least one of said active tags.

21. The system of claim 20, wherein said user management comprises one or more of accessing said active tag, editing said active tag, grouping said active tag, creating a template for said active tag and reusing a template for said active tag.

22. The system of claim 19, further comprising the steps of embedding at least one of said active tags and said corresponding system-generated content in a document and restoring information from said embedded active tag when said document is reloaded by a system.

23. An article of manufacture for run-time user control of system-generated content, comprising a tangible computer readable recordable medium containing one or more programs which when executed implement the steps of:

presenting said system-generated content to a user;

obtaining a configuration of one or more rules at run-time from said user substantially simultaneously with said user controlling said system-generated content, wherein said one or more rules identify a configuration of one or more automated actions to perform upon said system-generated content when one or more conditions are satisfied, wherein said one or more automated actions are linked to one or more active tags;

attaching one or more of said active tags to said system-generated content, wherein at least one of said active tags comprises information about said content, a context in which said content occurs, system-generated parameters for said automated actions, and user-specified parameters for customizing an execution of said automated actions; and executing said one or more automated actions upon said system-generated content when said one or more conditions are satisfied.

* * * * *